United States Patent
Szumski et al.

(12) 
(10) Patent No.: US 11,080,579 B2
(45) Date of Patent: Aug. 3, 2021

(54) NON-CONDUCTIVE MAGNETIC STRIPE ASSEMBLY

(71) Applicant: Illinois Tool Works Inc., Glenview, IL (US)

(72) Inventors: Daniel Szumski, Saint John, IN (US); Suwit John Sangkaratana, Crown Point, IN (US); Roger D. Strasemeier, Sauk Village, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 465 days.

(21) Appl. No.: 15/897,367

(22) Filed: Feb. 15, 2018

(65) Prior Publication Data

US 2018/0240002 A1 Aug. 23, 2018

Related U.S. Application Data

(60) Provisional application No. 62/460,981, filed on Feb. 20, 2017.

(51) Int. Cl.
*G06K 19/06* (2006.01)
*H05F 1/00* (2006.01)
(Continued)

(52) U.S. Cl.
CPC .......... *G06K 19/06196* (2013.01); *B32B 7/12* (2013.01); *B32B 15/08* (2013.01);
(Continued)

(58) Field of Classification Search
CPC ....... G06K 19/06196; G06K 19/06187; G06K 19/07318; G06K 19/07309; H05F 1/00;
(Continued)

(56) References Cited

U.S. PATENT DOCUMENTS

| 4,101,698 A | 7/1978 | Dunning et al. |
| 4,407,871 A | 10/1983 | Eisfeller |

(Continued)

FOREIGN PATENT DOCUMENTS

| EP | 2015232 A1 | 1/2009 |
| WO | 20070062170 A1 | 5/2007 |
| WO | 20070097775 A1 | 8/2007 |

OTHER PUBLICATIONS

International Search Report and Written Opinion for co-pending International Application No. PCT/US2018/018346 dated May 17, 2018 (13 pages).

(Continued)

*Primary Examiner* — Daniel I Walsh
(74) *Attorney, Agent, or Firm* — Christopher R. Carroll; The Small Patent Law Group LLC

(57) ABSTRACT

A card assembly includes an insulating planar body and a magnetic stripe assembly coupled with the planar body. The magnetic stripe assembly includes a magnetic layer configured to magnetically store information and a metal layer that provides at least one of a security feature, a decorative feature, or other functional feature. The metal layer has a small thickness such that the metal layer prevents conduction of electrostatic discharge (ESD) through the magnetic stripe assembly.

20 Claims, 1 Drawing Sheet

(51) Int. Cl.
*B42D 25/328* (2014.01)
*B42D 25/373* (2014.01)
*B32B 15/08* (2006.01)
*B32B 27/30* (2006.01)
*B32B 7/12* (2006.01)
*B32B 15/09* (2006.01)
*B42D 25/45* (2014.01)
*B32B 15/082* (2006.01)

(52) U.S. Cl.
CPC ............ *B32B 15/082* (2013.01); *B32B 15/09* (2013.01); *B32B 27/304* (2013.01); *B42D 25/328* (2014.10); *B42D 25/373* (2014.10); *B42D 25/45* (2014.10); *B32B 2255/10* (2013.01); *B32B 2255/205* (2013.01); *B32B 2307/202* (2013.01); *B32B 2307/206* (2013.01); *B32B 2307/208* (2013.01); *B32B 2307/416* (2013.01); *B32B 2307/732* (2013.01); *B32B 2425/00* (2013.01); *H05F 1/00* (2013.01)

(58) Field of Classification Search
CPC .............. B32B 7/025; B32B 2307/212; B32B 2307/20
See application file for complete search history.

(56) References Cited

U.S. PATENT DOCUMENTS

| | | | | | |
|---|---|---|---|---|---|
| 4,629,647 | A | * | 12/1986 | Sander | B41M 1/26 156/233 |
| 4,849,618 | A | * | 7/1989 | Namikawa | G06K 19/08 235/487 |
| 5,145,212 | A | * | 9/1992 | Mallik | G03H 1/0236 283/72 |
| 5,360,941 | A | * | 11/1994 | Roes | G06K 19/07327 174/378 |
| 5,388,862 | A | * | 2/1995 | Edwards | D21H 21/42 283/113 |
| 6,082,778 | A | * | 7/2000 | Solmsdorf | B42D 25/43 283/82 |
| 7,677,462 | B2 | * | 3/2010 | Hynes | G06K 19/06196 235/487 |
| 7,931,207 | B2 | * | 4/2011 | Holmes | B42D 25/29 235/488 |
| 10,336,125 | B2 | * | 7/2019 | Szumski | G06K 19/07735 |
| 10,769,515 | B2 | * | 9/2020 | Szumski | B32B 15/082 |
| 2002/0091512 | A1 | * | 7/2002 | Karttunen | G10L 15/193 704/202 |
| 2002/0160194 | A1 | * | 10/2002 | Phillips | B41M 3/14 428/403 |
| 2003/0061361 | A1 | * | 3/2003 | Bacik | H04L 69/329 709/228 |
| 2007/0201174 | A1 | * | 8/2007 | Hynes | G06K 19/06196 361/56 |
| 2007/0211398 | A1 | * | 9/2007 | Whitney | G06K 19/07735 361/42 |
| 2008/0024917 | A1 | * | 1/2008 | Hynes | G03H 1/0011 360/134 |
| 2008/0232221 | A1 | * | 9/2008 | Holmes | B42D 25/29 369/94 |
| 2008/0245865 | A1 | * | 10/2008 | Mosteller | B42D 25/351 235/449 |
| 2009/0301382 | A1 | * | 12/2009 | Patel | G01D 3/10 116/201 |
| 2010/0116891 | A1 | * | 5/2010 | Yano | G11B 5/00808 235/488 |
| 2011/0284636 | A1 | * | 11/2011 | Kasai | G11B 5/00808 235/449 |
| 2015/0041546 | A1 | * | 2/2015 | Herslow | G06K 19/07722 235/492 |
| 2015/0125670 | A1 | * | 5/2015 | Szumski | B32B 38/145 428/201 |
| 2015/0180229 | A1 | * | 6/2015 | Herslow | G06K 19/07749 361/56 |
| 2018/0232616 | A1 | * | 8/2018 | Szumski | B32B 27/36 |
| 2018/0240002 | A1 | * | 8/2018 | Szumski | G06K 19/06196 |

OTHER PUBLICATIONS

Reade Int'l Corp. "Amorphous Metals," (2018), available at https://www.reade.com/products/amorphous-metals, 4 pages.
Redwing, "Metallic Glass", MATSE801: Materials in Today's World, Pennsylvania State University (2018), available at https://www.e-education.psu.edu/matse81/node/2147. 4 pages.
Streetman, "Chapter 8 Field-Effect Transistors", Book, Solid State Electronic Devices, Fourth Edition, ISBN0-13-158767-6, pp. 288-295 USA, 8 Pages.
International Preliminary Report on Patentability and Written Opinion issued for PCT Application No. PCT/US2018/018346 dated Aug. 20, 2019 (7 pages).
Search Report dated Mar. 19, 2020 for corresponding Russian Application No. 2019129520 (2 pages).
English translation of the Search Report dated Mar. 19, 2020 for corresponding Russian Application No. 2019129520 (2 pages).
Office Action dated Mar. 19, 2020 for corresponding Russian Application No. 2019129520 (4 pages).
English translation of the Office Action dated Mar. 19, 2020 for corresponding Russian Application No. 2019129520 (3 pages).

* cited by examiner

NON-CONDUCTIVE MAGNETIC STRIPE ASSEMBLY

CROSS-REFERENCE TO RELATED APPLICATIONS

This application claims priority to U.S. patent application No. 62/460,981, which was filed on 20 Feb. 2017, and the entire disclosure of which is incorporated herein by reference.

BACKGROUND

The present disclosure relates to magnetic stripes of cards, such as security cards, identification cards, financial cards, etc. These types of cards may include holographic, reflective, or other optical features within magnetic stripes of the cards. These optical features may be created by including one or more metallic layers in the magnetic stripes of the cards.

The metallic layers, however, can conduct electric current. For example, the metallic layers can conduct electrostatic energy through the magnetic stripes during use of the cards, such as when the cards are swiped in a magnetic stripe reader. The metallic layers can conduct the electrostatic energy as electrostatic discharge (ESD), which can damage or destroy the magnetic stripe reader.

One approach to preventing ESD-based damage to the readers includes separating the metallic layer(s) in the magnetic stripes into separate bodies or islands. This separation prevents a conductive pathway from extending through the magnetic stripe from one edge of the card to another edge, and can prevent ESD. But, this separation also can produce undesirable visual effects. For example, some users of the cards may not want the gaps between the bodies or islands to be visible in the magnetic stripes.

BRIEF DESCRIPTION

In one embodiment, a card assembly includes an insulating planar body and a magnetic stripe assembly coupled with the planar body. The magnetic stripe assembly includes a magnetic layer configured to magnetically store information and a metal layer that provides at least one of a security feature, a decorative feature, or other functional feature. The metal layer has a small thickness such that the metal layer prevents conduction of electrostatic discharge (ESD) through the magnetic stripe assembly.

In one embodiment, a magnetic tape assembly includes a magnetic coating layer configured to magnetically store information for a card assembly and a metal layer that provides at least one of a security feature, a decorative feature, or other functional feature of the card assembly. The metal layer has a small thickness such that the metal layer prevents conduction of electrostatic discharge (ESD) through the card assembly.

In one embodiment, a method includes applying a metal layer to a magnetic tape assembly having a magnetic layer configured to magnetically store information for a card assembly. The metal layer is applied to provide at least one of a security feature, a decorative feature, or other functional feature of the card assembly. The metal layer is applied to have a small thickness such that the metal layer prevents conduction of electrostatic discharge (ESD) through the card assembly.

DETAILED DESCRIPTION

Figure 1:
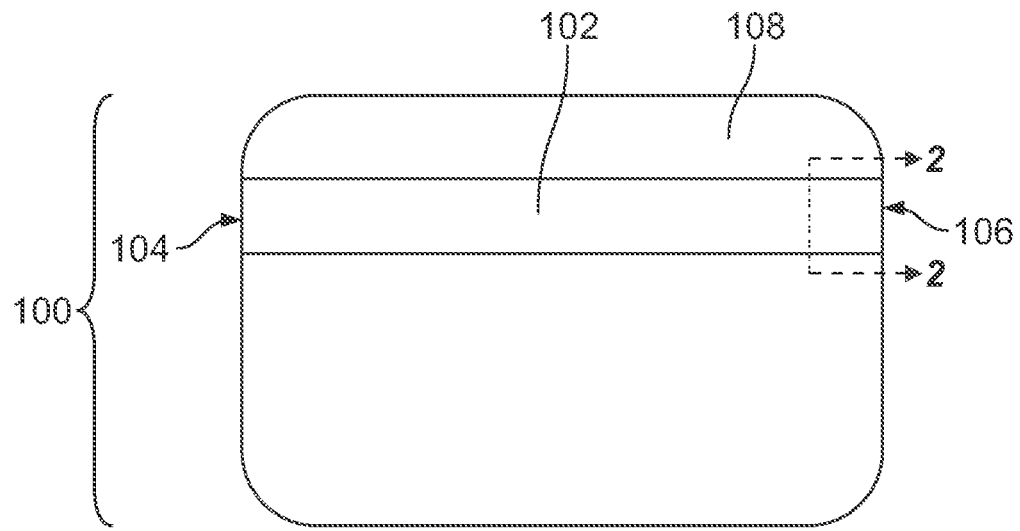
FIG. 1 illustrates a back side of a card assembly having one embodiment of a non-ESD-conducting magnetic stripe assembly.

FIG. 1 illustrates a back side of a card assembly 100 having one embodiment of a non-ESD-conducting magnetic stripe assembly 102. The magnetic stripe assembly 102 may be encoded with information used to conduct one or more transactions, identify the holder of the card assembly, or the like. The magnetic stripe assembly 102 may reflect incident light to provide a holographic or other optical effect. This optical effect can be created by one or more reflective films in the magnetic stripe assembly 102. The optical effect can be used to provide at least one of a security feature, a decorative feature, or other functional feature of the card assembly 100.

Figure 2:
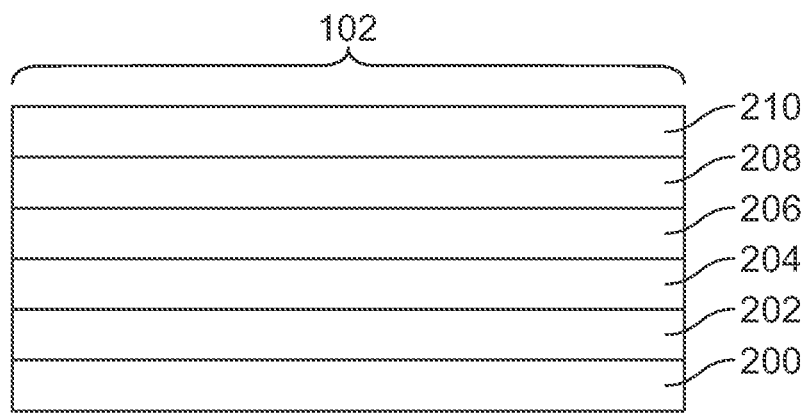
FIG. 2 illustrates a cross-sectional view of the stripe assembly along line 2-2 shown in FIG. 1.

The card assembly 100 has a planar or substantially planar body 108 that may be formed from a nonconductive or insulating material, such as polyvinyl chloride (PVC). The card assembly 100 includes a metal coated or metalized magnetic stripe assembly 102. The magnetic stripe assembly 102 may be used to magnetically store information that is read from the card assembly 100. The magnetic stripe assembly 102 may be formed as a holographic magnetic stripe. FIG. 2 illustrates a cross-sectional view of the stripe assembly 102 along line 2-2 shown in FIG. 1.

The holographic magnetic stripe assembly 102 includes a carrier film 210 (e.g., PET) that is removed when the magnetic stripe is transferred to the card assembly 100. A top coat layer 208 is disposed on the carrier. The top coat layer 208 may include a holographic image that is embossed within the top coat layer 208. A metal layer 206 is deposited on the top coat 208. The metal layer 206 includes a conductive metal portion (e.g., vacuum deposited aluminum, copper, aluminum/chrome alloys, etc.), which provides a reflective body used to view a holographic image provided by the magnetic stripe assembly 102. A tie coat layer 204 is disposed on the metal layer 206. A magnetic coating layer 202 is disposed on the tie coat layer 204 and is the layer that magnetically stores information associated with card assembly 100. An adhesive layer 200 is deposited on the magnetic layer that contacts the body of the card assembly 100.

The metal layer 206 is formed as an optically continuous metal body that prevents conduction of electric current (e.g., ESD) through the metal layer 206 and between opposite edges 104, 106 (shown in FIG. 1) of the card assembly 100. The metal layer 206 is optically continuous in that the metal layer 206 does not appear to be formed from separate, spaced apart bodies when viewed without magnification. Optionally, the metal layer 206 may not include a regular array or arrangement of spaced apart metal bodies that is repeated one or more times. Instead, any spaced apart metal bodies in the metal layer 206 may be irregularly spaced apart from each other, and the metal bodies may have different sizes and/or shapes. The metal layer 206 is formed from a metal or metal alloy, such as an aluminum-containing metal alloy. Optionally, another type of metal or metal alloy, or one or more additional metals or metal alloys may be used to form the metal layer 206. For example, one or more of zinc, gallium, cadmium, copper, indium, nickel, cobalt, iron, magnesium, platinum, chromium, tin, silver, rhodium, and/or palladium may be used.

The metal layer 206 is sufficiently thin to prevent conduction of current (e.g., ESD) through the metal layer 206. For example, the metal layer 206 may be very thin and have a thickness dimension that is sufficiently small to block or prevent conduction of electric current between different edges 104, 106 of the card assembly 100 through the metal layer 206. For example, the thickness of the metal layer 206 can be measured as less than 1,500 angstroms. Alternatively, the metal layer 206 may have a smaller thickness dimension. In one embodiment, the optical density of the metal layer 206 is at least 0.25 but no greater than 4.0.

The metal layer 206 is an optically continuous layer in one embodiment in that the metal layer 206 is not separated or divided up into many pieces (or many separate metal bodies). Some card assemblies include metal or conducting layers that are divided up into visible metal bodies to prevent forming a conductive series or pathway through the metal layers between opposite edges of the card assemblies. The metal layer 206 is constructed as an optically continuous metal layer or body with a small thickness to eliminate electrostatic discharge that otherwise could damage an electronic reader device that reads the information stored in the magnetic layer, such as a point of sale terminal machine. The stripe 102 can be formed by adding aluminum or another metal to a holographic tape. The holographic tape may be formed from the adhesive coating layer 200, the magnetic coating layer 202, and the tie coating layer 204. The addition of the aluminum or other metal forms the metal layer 206 on the holographic tape. The metal of the metal layer 206 may be added to the holographic tape by evaporating the metal onto the holographic tape.

The thin, continuous metal layer 206 enables the holographic or other optical effect provided by the holographic tape, while preventing conduction of ESD through the magnetic stripe 102. Because the metal layer 206 is optically continuous, the metal layer 206 does not provide the visually undesirable breaks or gaps between separate bodies of metal layers in other magnetic stripes.

Figure 3:
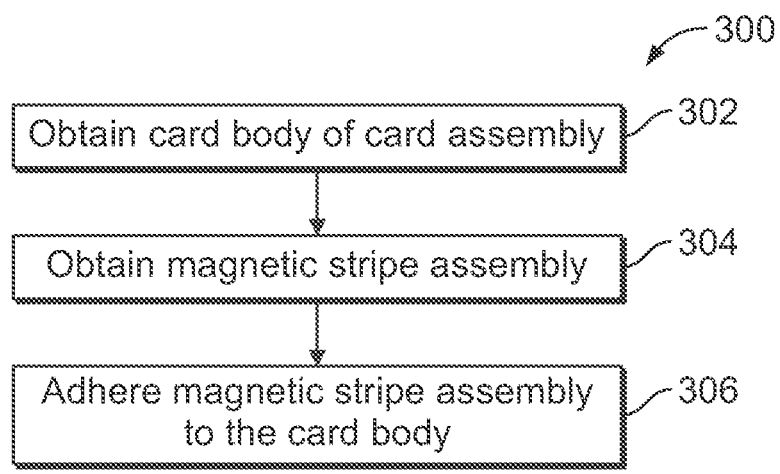
FIG. 3 illustrates a flowchart of one embodiment of a method for manufacturing a non-conductive magnetic stripe assembly.

FIG. 3 illustrates a flowchart of one embodiment of a method 300 for manufacturing a non-conductive magnetic stripe assembly. The method 300 can be used to create one or more embodiments of the magnetic stripe assemblies described and/or shown herein. At 302, a card body of a card assembly is obtained. The card assembly can be a planar or substantially planar card, such as a credit card, identification card, or the like. The body of the card assembly can be formed from a nonconductive or insulating material, such as PVC.

At 304, a magnetic stripe assembly is obtained. The magnetic stripe assembly can be obtained as a roll or elongated body of a metal coated or metalized magnetic stripe assembly. In one embodiment, this magnetic stripe assembly is a holographic magnetic stripe. The magnetic stripe assembly can be disposed on a carrier film, as described above. This carrier film can provide structural support to the other layers or films of the magnetic stripe assembly prior to adhering the magnetic stripe assembly to the card body. As described above, the magnetic stripe assembly can include a top coat layer, a metal layer, a tie coat layer, a magnetic coating layer, and the adhesive layer. The metal layer is sufficiently thin to prevent conduction of current (e.g., ESD) through the metal layer, as described above.

At 306, the magnetic stripe assembly with the carrier film is adhered to one side of the body of the card assembly. For example, the magnetic stripe assembly can be coupled to the back side of the card assembly using the adhesive layer. At 308, the carrier film of the magnetic stripe assembly is removed. Optionally, the carrier film can be removed as the magnetic stripe assembly is coupled with the card assembly.

In one embodiment, a method includes applying a metal layer to a magnetic tape assembly having a magnetic layer configured to magnetically store information for a card assembly. The metal layer is applied to provide at least one of a security feature, a decorative feature, or other functional feature of the card assembly. The metal layer is applied to have a small thickness such that the metal layer prevents conduction of electrostatic discharge (ESD) through the card assembly.

In one example, the metal layer is formed from one or more of aluminum, zinc, gallium, indium, cadmium, copper, nickel, cobalt, iron, magnesium, platinum, tin, chromium, silver, rhodium, or palladium.

In one example, the metal layer provides one or more of a reflective mirror surface or a holographic effect.

In one example, the metal layer is applied to the magnetic tape assembly to have an optical density of at least 0.25.

In one example, the metal layer is applied to the magnetic tape assembly to have an optical density that is no greater than 4.0.

In one example, the metal layer is applied to be optically continuous without magnification.

In one example, the metal layer is applied to not have include regularly spaced or arranged spaced-apart metal bodies.

In one example, the metal layer is applied to not have a repeating arrangement of spaced-apart metal bodies.

In one embodiment, a card assembly includes an insulating planar body and a magnetic stripe assembly coupled with the planar body. The magnetic stripe assembly includes a magnetic layer configured to magnetically store information and a metal layer that provides at least one of a security feature, a decorative feature, or other functional feature. The metal layer has a small thickness such that the metal layer prevents conduction of electrostatic discharge (ESD) through the magnetic stripe assembly.

In one example, the metal layer is formed from one or more of aluminum, zinc, gallium, indium, cadmium, copper, nickel, cobalt, iron, magnesium, platinum, tin, chromium, silver, rhodium, or palladium.

In one example, the magnetic stripe assembly has one or more of a reflective mirror surface or a holographic effect.

In one example, the metal layer of the magnetic stripe assembly has an optical density of at least 0.25.

In one example, the metal layer of the magnetic stripe assembly has an optical density that is no greater than 4.0.

In one example, the metal layer is optically continuous without magnification from one edge of the planar body to an opposite edge of the planar body.

In one example, the metal layer does not include regularly spaced or arranged spaced-apart metal bodies.

In one example, the metal layer does not include a repeating arrangement of spaced-apart metal bodies.

In one embodiment, a magnetic tape assembly includes a magnetic coating layer configured to magnetically store information for a card assembly and a metal layer that provides at least one of a security feature, a decorative feature, or other functional feature of the card assembly. The metal layer has a small thickness such that the metal layer prevents conduction of electrostatic discharge (ESD) through the card assembly.

In one example, the metal layer is formed from one or more of aluminum, zinc, gallium, indium, cadmium, copper, nickel, cobalt, iron, magnesium, platinum, tin, chromium, silver, rhodium, or palladium.

In one example, the metal layer provides one or more of a reflective mirror surface or a holographic effect.

In one example, the metal layer of the magnetic stripe assembly has an optical density of at least 0.25.

In one example, the metal layer of the magnetic stripe assembly has an optical density that is no greater than 4.0.

In one example, the metal layer is optically continuous without magnification.

In one example, the metal layer does not include regularly spaced or arranged spaced-apart metal bodies.

In one example, the metal layer does not include a repeating arrangement of spaced-apart metal bodies.

In one embodiment, a method includes applying a metal layer to a magnetic tape assembly having a magnetic layer configured to magnetically store information for a card assembly. The metal layer is applied to provide at least one of a security feature, a decorative feature, or other functional feature of the card assembly. The metal layer is applied to have a small thickness such that the metal layer prevents conduction of electrostatic discharge (ESD) through the card assembly.

In one example, the metal layer is formed from one or more of aluminum, zinc, gallium, indium, cadmium, copper, nickel, cobalt, iron, magnesium, platinum, tin, chromium, silver, rhodium, or palladium.

In one example, the metal layer provides one or more of a reflective mirror surface or a holographic effect.

In one example, the metal layer is applied to the magnetic tape assembly to have an optical density of at least 0.25.

In one example, the metal layer is applied to the magnetic tape assembly to have an optical density that is no greater than 4.0.

In one example, the metal layer is applied to be optically continuous without magnification.

In one example, the metal layer is applied to not have include regularly spaced or arranged spaced-apart metal bodies.

In one example, the metal layer is applied to not have a repeating arrangement of spaced-apart metal bodies.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. For example, the recitation of a "mechanism for," "module for," "device for," "unit for," "component for," "element for," "member for," "apparatus for," "machine for," or "system for" is not to be interpreted as invoking 35 U.S.C. § 112(f), and any claim that recites one or more of these terms is not to be interpreted as a means-plus-function claim.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A card assembly that extends from a first edge to an opposite second edge, the card assembly comprising:
    an insulating planar body; and
    a magnetic stripe assembly coupled with the planar body, the magnetic stripe assembly including a magnetic layer configured to magnetically store information and a metal layer that provides at least one of a security feature, a decorative feature, or other functional feature,
    wherein the metal layer continuously extends from the first edge to the second edge of the card assembly,
    wherein the metal layer has a small thickness such that the metal layer prevents conduction of electrostatic discharge (ESD) through the magnetic stripe assembly from the first edge to the second edge of the card assembly.

2. The card assembly of claim 1, wherein the metal layer comprises at least one of one or more of aluminum, zinc, gallium, indium, cadmium, copper, nickel, cobalt, iron, magnesium, platinum, tin, chromium, silver, rhodium, or palladium.

3. The card assembly of claim 1, wherein the magnetic stripe assembly has one or more of a reflective mirror surface or a holographic effect.

4. The card assembly of claim 1, wherein the metal layer of the magnetic stripe assembly has an optical density of at least 0.25.

5. The card assembly of claim 1, wherein the metal layer of the magnetic stripe assembly has an optical density that is no greater than 4.0.

6. The card assembly of claim 1, wherein the metal layer is optically continuous without magnification from the first edge of the card assembly to the second edge of the card assembly.

7. The card assembly of claim 1, wherein the metal layer does not include regularly spaced or arranged spaced-apart metal bodies.

8. The card assembly of claim 1, wherein the metal layer does not include a repeating arrangement of spaced-apart metal bodies.

9. A magnetic tape assembly comprising:
a magnetic coating layer configured to magnetically store information for a card assembly that extends from a first edge to an opposite second edge; and
a metal layer that provides at least one of a security feature, a decorative feature, or other functional feature of the card assembly, the metal layer continuously extending from the first edge to the second edge of the card assembly and having a small thickness such that the metal layer prevents conduction of electrostatic discharge (ESD) through the card assembly from the first edge to the second edge of the card assembly.

10. The magnetic tape assembly of claim 9, wherein the metal layer comprises at least one of one or more of aluminum, zinc, gallium, indium, cadmium, copper, nickel, cobalt, iron, magnesium, platinum, tin, chromium, silver, rhodium, or palladium.

11. The magnetic tape assembly of claim 9, wherein the metal layer includes laser ablating or engraving lines in the metal layer to have one or more of a reflective mirror surface or a holographic effect.

12. The magnetic tape assembly of claim 9, wherein the metal layer has an optical density of at least 0.25.

13. The magnetic tape assembly of claim 9, wherein the metal layer has an optical density that is no greater than 4.0.

14. The magnetic tape assembly of claim 9, wherein the metal layer is optically continuous without magnification.

15. The magnetic tape assembly of claim 9, wherein the metal layer does not include regularly spaced or arranged spaced-apart metal bodies.

16. The magnetic tape assembly of claim 9, wherein the metal layer does not include a repeating arrangement of spaced-apart metal bodies.

17. A method comprising:
applying a metal layer to a magnetic tape assembly having a magnetic layer configured to magnetically store information for a card assembly that extends from a first edge to an opposite second edge, the metal layer applied to the magnetic tape assembly in a continuous layer extending from the first edge to the second edge, wherein the metal layer is applied to provide at least one of a security feature, a decorative feature, or other functional feature of the card assembly, the metal layer applied to have a small thickness such that the metal layer prevents conduction of electrostatic discharge (ESD) through the card assembly.

18. The method of claim 17, wherein the metal layer comprises at least one of one or more of aluminum, zinc, gallium, indium, cadmium, copper, nickel, cobalt, iron, magnesium, platinum, tin, chromium, silver, rhodium, or palladium.

19. The method of claim 17, wherein the metal layer provides one or more of a reflective mirror surface or a holographic effect.

20. The method of claim 17, wherein the metal layer is applied to the magnetic tape assembly to have an optical density of at least 0.25.

* * * * *